March 16, 1965
J. A. DERSCH ETAL
3,173,384
BAKING OVEN
Filed June 7, 1961
4 Sheets-Sheet 1
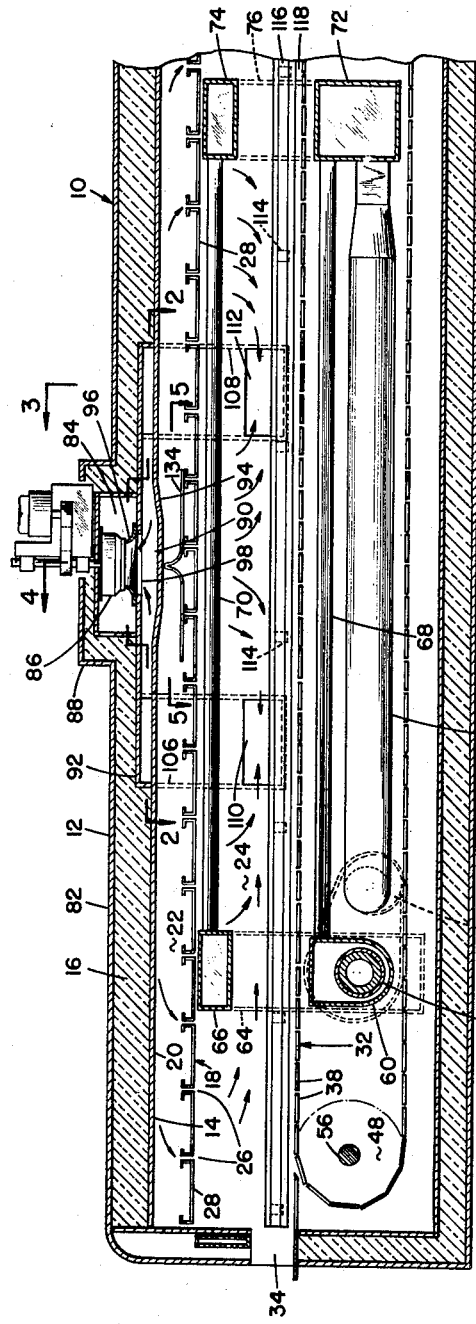
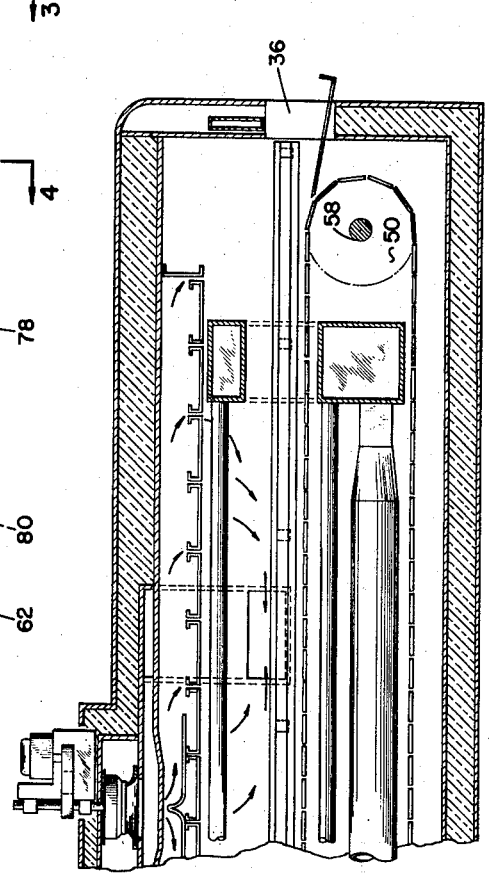
*INVENTOR.*
JOHN A. DERSCH
BY  WAYNE H. ROYER
*Otto Moeller*
Attorney March 16, 1965    J. A. DERSCH ETAL    3,173,384
BAKING OVEN
Filed June 7, 1961    4 Sheets-Sheet 2

*INVENTOR.*
JOHN A. DERSCH
BY  WAYNE H. ROYER

Otto Moeller
Attorney

March 16, 1965  J. A. DERSCH ETAL  3,173,384
BAKING OVEN
Filed June 7, 1961  4 Sheets-Sheet 3

INVENTOR.
JOHN A. DERSCH
WAYNE H. ROYER
BY
Otto Moeller
Attorney

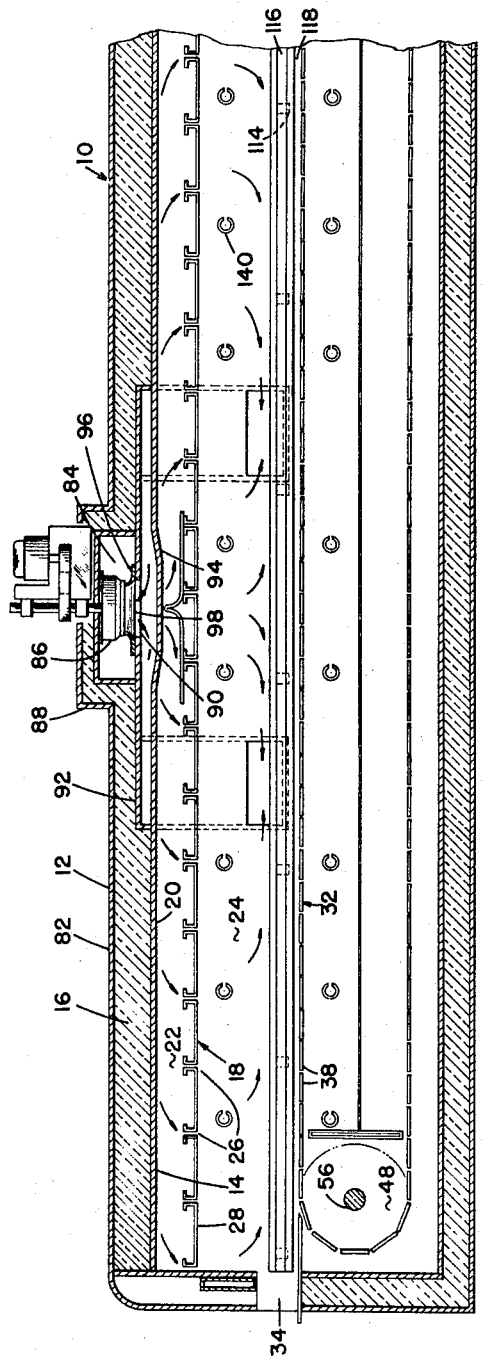
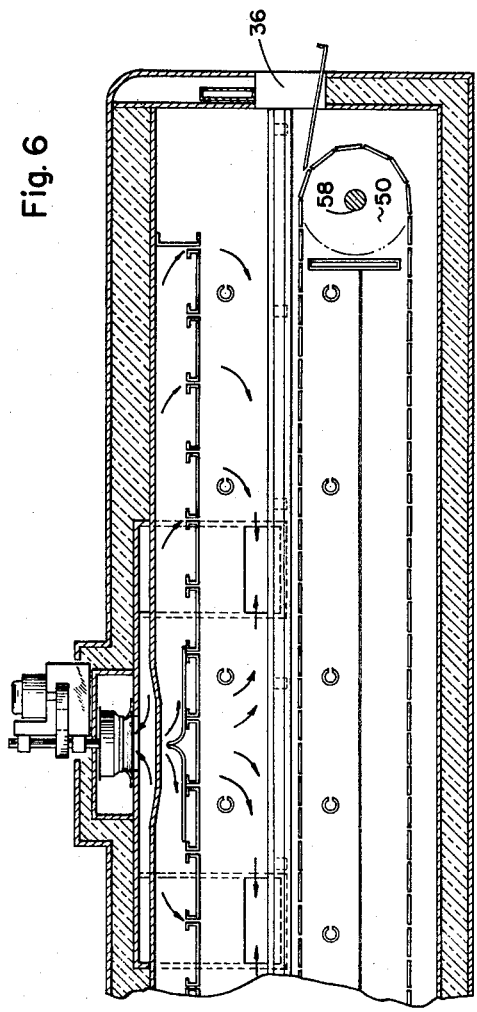
INVENTOR.
JOHN A. DERSCH
BY   WAYNE H. ROYER
Otto Mueller
Attorney

United States Patent Office 3,173,384
Patented Mar. 16, 1965

3,173,384
BAKING OVEN
John A. Dersch and Wayne H. Royer, York, Pa., assignors, by mesne assignments, to Baker Perkins, Inc., New York, N.Y., a corporation of New York
Filed June 7, 1961, Ser. No. 115,411
9 Claims. (Cl. 107—57)

This invention relates to improvements in commercial baking ovens of the plate hearth tunnel type wherein dough products are continuously moved through the baking chamber.

A primary object of the invention resides in the provision of a novel construction and arrangement of means for improving the baking characteristics of a plate hearth tunnel type oven.

While the desirability of providing for agitation of the heated air and gases in oven baking chambers for effecting a more uniform distribution of heat to obtain more uniform baking and crust coloration of loaves of bread or other baked goods has been previously appreciated, entirely satisfactory results have not in the past been attainable in ovens of the plate hearth type. It is, consequently, a more specific object of the invention to provide in such ovens a construction and arrangement of elements for continuously moving and recirculating oven atmosphere and gases throughout the oven heating zone in a manner to effect a more even distribution of heat lengthwise and crosswise of the baking chamber with resultant more uniform baking and coloring of the dough products.

Another object is to provide a novel and improved circulating system for a plate hearth tunnel type oven, wherein the gaseous medium is forcibly discharged downward toward the product to be baked throughout the length and width of the oven from a plenum chamber in the upper portion thereof, and is withdrawn through openings, at spaced intervals along both sides of the oven adjacent the plate hearth, communicating with ducts leading to the intake side of a suction blower, the discharge side of which suction blower communicates with the plenum chamber for recirculating the gaseous medium.

Another object is to provide a novel and improved circulating system for a plate hearth tunnel type oven including a plurality of tandem arranged circulating units providing for distribution of heat to the products to be baked and that is adapted for adjustment of the circulating units for establishing desired heating conditions in different zones lengthwise of the oven, and in each of which zones the heat is distributed throughout the length and breadth thereof to provide for even and uniform baking of the products.

Other objects and advantages more or less ancillary to the foregoing and the manner in which all of the various objects are realized will appear in the following description, which considered in connection with the accompanying drawings, set forth the preferred embodiments of the invention.

In the drawings:

FIGURES 1 and 1a are longitudinal vertical sectional views through the forward and rearward ends of the oven;

FIGURES 6 and 6a are longitudinal vertical sectional views through the forward and rearward ends of the oven showing a modified form of heating system.

Figure 2:
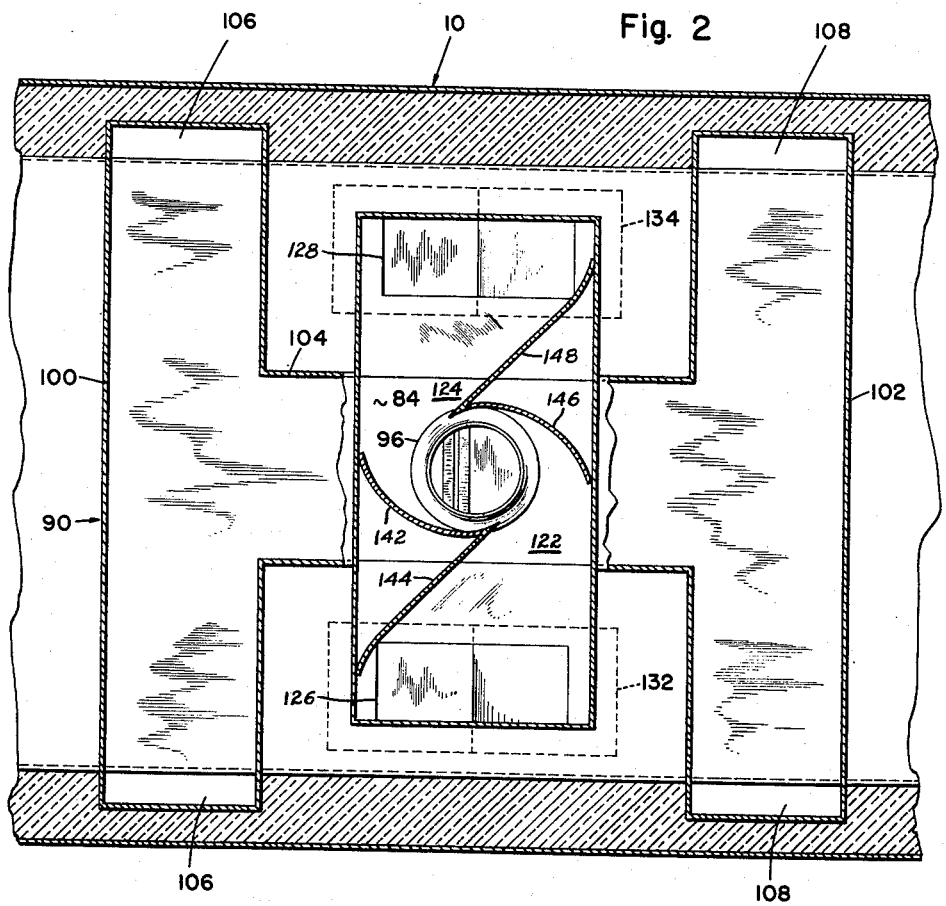
FIGURE 2 is a sectional view taken on line 2—2 of FIGURE 1.

Referring to the drawings, the baking oven 10 is of generally rectangular elongated shape, including an outer housing 12 preferably formed of sheet metal supported and reinforced in suitable and well known manner, and a spaced generally similar inner housing 14. Interposed between the walls of the outer and inner housings of the oven is suitable heat insulating material 16.

The interior of the oven is provided with a horizontal upper partition 18 forming with the top wall 20 of the inner housing 14 a plenum chamber 22 from which recirculated baking chamber atmosphere is re-introduced into the baking chamber 24, all as hereinafter more fully described. The partition 18 extends substantially the width of the interior of the oven and preferably, as shown extends substantially the length thereof. Actually the partition may terminate somewhat short of the ends of the oven without materially affecting the efficient functioning of the invention, being dictated in some instances by interfering accessories or appurtenances. It is important, however, that the partition 18 extend as nearly as possible the width of the oven and, except for minor spaces at the ends, as nearly as possible the length thereof so that the plenum chamber 22 covers practically the entire area at the top of the oven.

The partition 18 is formed to provide a plurality of longitudinally, and preferably equidistantly spaced, transversely extending narrow elongated vents 26 through which recirculated baking chamber atmosphere passes from the plenum chamber 22 into the baking chamber 24. In a preferred form, the partition 18 comprises a plurality of horizontal plates 28 extending transversely across substantially the width of the oven, which plates 28 are supported in any suitable manner, as by brackets 30 which are secured to the side walls of the inner housing 14. The plates 28 are spaced slightly apart to form therebetween the vents 26 which extend substantially the width of the oven.

The products to be baked are transported through the oven on the upper run of an endless solid travelling hearth 32, from a position adjacent the loading opening 34 at the forward end of the oven to a position adjacent the unloading opening 36 at the rearward end of the oven. The travelling hearth 32, referring particularly to FIGURE 3, may be of a type well known in the art comprising a plurality of contiguous laterally extending solid hearth plates 38 attached at their ends to lugs 40 of the inner links 42 of the roller chains 44. The rollers 46 of the roller chains 44 are trained over sprockets 48 at the forward end of the oven and sprockets 50 at the rearward end of the oven and are adapted to travel in usual manner over upper tracks 52 secured to opposite side walls of inner housing 14 and lower tracks 54 also secured to opposite side walls of inner housing 14. Sprockets 48 and 50 are mounted respectively on shafts 56 and 58, one of which is positively driven by suitable means, not shown.

In FIGURE 1 there is illustrated a heating and oven atmosphere recirculating system. In a comparatively short oven, one such system extending as nearly as practicable the length of the oven will suffice. However, tunnel type ovens are generally of considerable length, and for practical purposes it is desirable to provide two or more such systems, one immediately following the other, the rearward end portion of a final system being shown in FIGURE 1a. One of such systems is hereinafter described in detail, it being understood that it applies to each of a number of such systems disposed in the oven.

The heating unit of each heating zone includes a mixing chamber or header 60 at the forward end thereof extending transversely into the oven from one side thereof, which chamber or header is disposed between the upper and lower runs of the endless travelling hearth 32. Mounted within and in spaced relation to the walls of the mixing chamber or header 60 is a tubular burner housing 62 with which is associated, in well known manner, a suitable burner, not shown, adapted to burn liquid fuel or gas, as desired.

Extending upwardly from and communicating with the opposite ends of the header 60 are ducts 64, respectively disposed between the inner and outer walls of the opposite sides of the oven. The upper ends of the ducts 64 communicate with the opposite ends of an upper front header 66 which extends transversely across the width of the oven and is disposed between the upper run of the endless travelling hearth 32 and the partition 18.

Disposed within the baking chamber 24 in communication with and extending horizontally rearward of the headers 60 and 66 are lower and upper banks 68 and 70 of transversely spaced apart flues. The lower bank of flues 68 is disposed between the upper and lower runs of the endless travelling hearth 32, and the upper bank of flues 70 is disposed between the partition 18 and the upper run of the endless travelling hearth 32. At their rearward ends, the banks of flues 68 and 70 communicate respectively with the lower rear header 72 and the upper rear header 74. The headers 72 and 74 extend transversely the width of the oven and are connected at their opposite ends to vertically extending ducts 76, disposed between the inner and outer walls of the opposite sides of the oven.

A return flue 78 communicates with the lower portion of header 72 and extends forwardly therefrom, centrally between the sides of the oven and between the lower run of the endless travelling hearth 32 and the lower bank of flues 68, to the suction side of the blower 80. The discharge side of the blower 80 is connected to mixing chamber or header 60, whereby the hot products of combustion are recirculated. While not shown, it is understood that a damper regulated stack is disposed between the blower 80 and the mixing chamber or header 60, in conventional manner, to vent a desired proportion of the combustion gases after having passed through the heating system.

Figure 4:
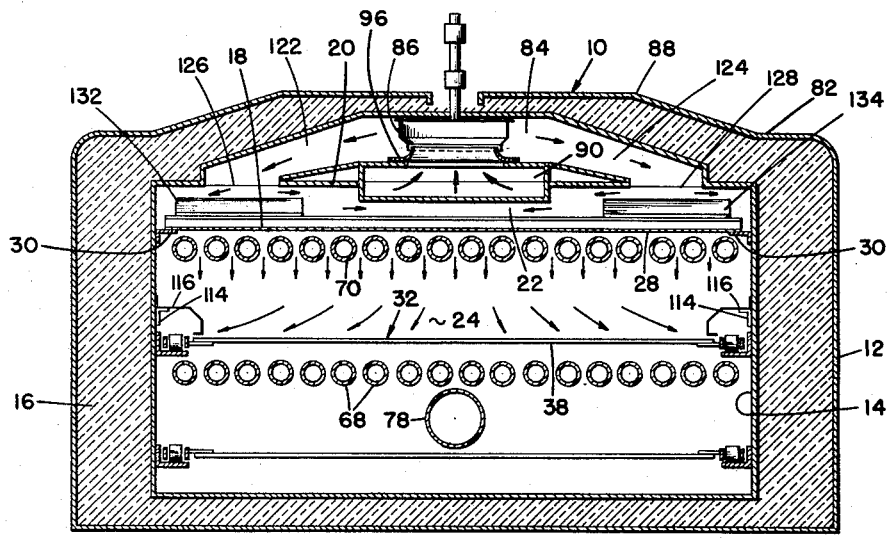
FIGURE 4 is a sectional view taken on line 4—4 of FIGURE 1.

Referring now to the oven atmosphere circulating system, there is disposed in the top of the oven between and spaced from the inner housing top wall 20 and the outer housing top wall 82, a rectangular blower chamber 84 housing the blower 86. In order to accommodate the blower chamber 84, the outer housing top wall 82 is provided with a hump or turret 88, as shown in FIGURES 1 and 4. The blower chamber 84 and the blower 86 therein, are disposed centrally between the sides of the oven and centrally between the ends of the heating zone described above.

The inlet of the blower 86 communicates with a collecting chamber 90, which is horizontal cross section is substantially H-shaped, as best shown in FIGURE 2. The collecting chamber 90, hereinafter described in more detail, extends longitudinally in both directions a substantial distance beyond the blower chamber 84, as clearly shown in FIGURE 1. It includes a top wall 92, a portion of which also forms a bottom wall for the blower chamber 84, and further includes a bottom wall 94 which is actually a part of the inner housing top wall 20. A ring 96 embraces the intake side of the blower 86 and an opening 98 in that portion of wall 92 forming the bottom of the blower chamber 84, whereby atmosphere is withdrawn from collecting chamber 90.

Figure 3:
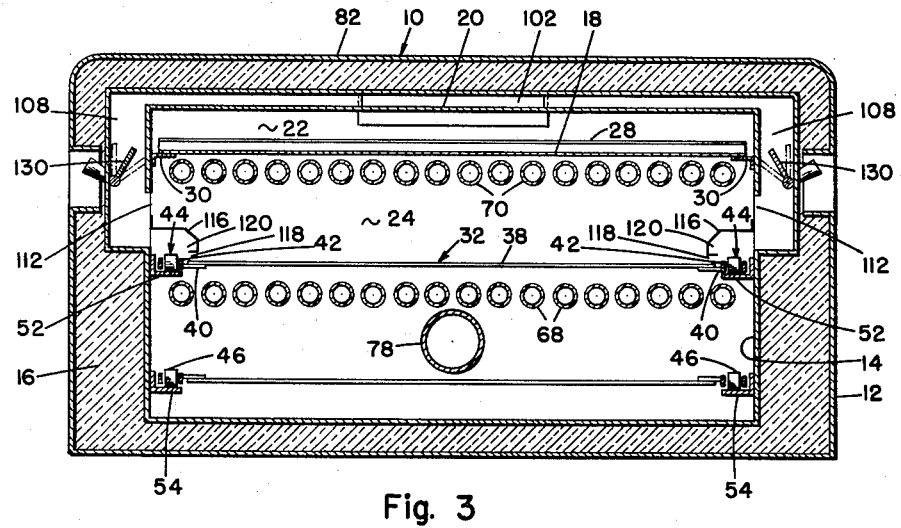
FIGURE 3 is a sectional view taken on line 3—3 of FIGURE 1.

The longitudinally spaced forward and rearward header portions 100 and 102 of the H-shaped collecting chamber 90 extend transversely the width of the oven, as best shown in FIGURES 2 and 3. The longitudinally extending connecting portion 104 of the H-shaped collecting chamber 90, and with which the intake side of the blower 86 communicates, as above described, is in centrally disposed spaced relation with respect to the sides of the oven.

Extending downwardly from and in communication with the opposite ends of the collecting chamber header portions 100 and 102 are vertical ducts 106 and 108, all disposed between the inner and outer walls of the opposite sides of the oven. At their lower ends the ducts 106 and 108 communicate with the baking chamber 24 through openings 110 and 112 in the opposite inner side walls of the oven. The lower marginal edges of the openings 110 and 112 are at approximately the level of the upper run of the travelling hearth 32.

Extending the length of the oven along the opposite inner side walls thereof and secured thereto by a number of longitudinally spaced brackets 114 are pan guides 116. The pan guides 116 project inwardly over the roller chains 44 of the upper run of the travelling hearth 32 and then extend downwardly toward but stopping short of the top face of the end portions of the hearth plates 38 to form longitudinally extending slots 118. The pan guides 116 thus form with the inner side walls of the oven and the upper tracks 52 for the travelling hearth roller chains 44, ducts 120 extending longitudinally the length of the oven. The inwardly projecting walls of the pan guides 116 divide the openings 110 and 112 into upper and lower portions so that baking chamber atmosphere passes from the baking chamber 24 into the lower ends of the vertical ducts 106 and 108 through the upper portions of the openings 110 and 112, and also passes from the baking chamber 24 into the lower ends of the vertical ducts 106 and 108 through the slots 118, ducts 120 and the lower portions of the openings 110 and 112. From the vertical ducts 106 and 108, the baking chamber atmosphere passes into the collecting chamber 90 and then to the inlet of the blower 86.

From the outlet of the blower 86, the baking chamber atmosphere passes into the blower chamber 84. Disposed in the blower chamber 84, as best shown in FIGURE 2, are a pair of vertically disposed baffle lates 142 and 144, and a pair of vertically disposed baffle plates 146 and 148, the respective pairs of baffle plates forming laterally directed oppositely flaring ducts 122 and 124 to provide communication between opposite halves of the blower outlet and respective openings 126 and 128 in the inner housing top wall 20, whereby recirculated baking chamber atmosphere is delivered to the plenum chamber 22.

The recirculated baking chamber atmosphere is thus forced by the blower 86 from the blower chamber 84 through ducts 122 and 124, then through openings 126 and 128 into plenum chamber 22, where it is forced throughout the length and width of the plenum chamber 22. From the plenum chamber 22 the recirculated baking chamber atmosphere is forced downwardly throughout the baking chamber 24 through the vents 26 in the plenum chamber partition 18. The baking chamber atmosphere forced through the vents 26 passes between the upper bank of heating flues 70 picking up heat, and is distributed over the products to be baked.

By reason of the above construction there is a continuous circulation and agitation of baking chamber atmosphere throughout the baking chamber, providing a high degree of uniform distribution of heat over the entire solid hearth 32. The baking chamber atmosphere is returned to the intake side of the blower 86 through the inner side wall openings 110 and 112 both directly and through the slots 118 of the ducts 116, in the manner described above. Thus there is a flow in the baking chamber downward through the vents in the partition 18 throughout the length and width thereof, with a portion of the atmosphere flowing in generally forward and rearward directions toward the upper portions of the inner side wall openings 110 and 112, and a portion of the atmosphere flowing laterally toward the slots 118 to provide an effective constant circulation and agitation of the atmosphere throughout the baking chamber, and eliminating any tendency to form areas of stagnant air.

Disposed in the vertical return ducts 108, as shown in FIGURE 3, are adjustable dampers 130 whereby the volume and velocity of the atmosphere being circulated through the baking chamber may be regulated to effect the desired top heat on the product. It is understood that similar dampers are provided in the vertical return ducts 106.

Figure 5:
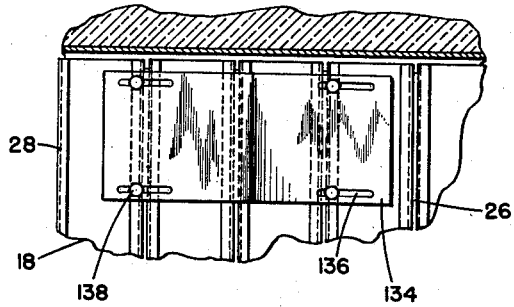
FIGURE 5 is a fragmentary sectional view taken on line 5—5 of FIGURE 1 at the far side of the oven.

Mounted on the partition 18 within the plenum chamber 22 beneath the openings 126 and 128 from the ducts 122 and 124 are longitudinally adjustable deflector plates 132 and 134. The deflector plates 132 and 134 are provided with central transversely extending shallow inverted V-shaped ridges, so that by adjusting the plates 132 and 134 fore and aft, more or less of the atmosphere discharged from the ducts 122 and 124 can be deflected toward the front or toward the rear of the oven, as desired, to obtain an even distribution of atmosphere throughout the plenum chamber 22. Any suitable means may be employed for adjusting the deflector plates, such as the slots 136 in the deflector plates and cap screws 138 for securing the plates to the partition 18 in any one of a number of adjusted positions, as best shown in FIGURE 5.

While the invention has been described above as applied to an indirect fired oven, it is also applicable to a direct fired oven as illustrated in the modification shown in FIGURES 6 and 6a. In the modified form of the invention the indirect flue heating arrangement of the preferred form of the invention is replaced by a series of longitudinally spaced laterally extending ribbon type gas burners 140, which are of any desired form conventional and well known in the art. In all respects except for the substitution of the ribbon type gas burners 140 for the indirect flue heating means the construction of the modified form of the invention is the same as the preferred form of the invention, so that for convenience similar elements in the two forms of the invention are indicated by the same reference characters. In the modified form of the invention it is apparent that the recirculated baking chamber atmosphere includes the products of combustion of the gas burners 140.

We claim:

1. In a circulating system for an oven having a solid hearth and a heating zone of longitudinally elongated extent, a horizontal partition in the upper portion of said oven defining a plenum chamber with the ceiling of said oven and a baking chamber with said hearth, a plurality of vents distributed over the area of said partition providing communication between said plenum chamber and said baking chamber, a blower in said ceiling between the ends of said heating zone, a collecting chamber in said ceiling, said collecting chamber including header portions fore and aft of said blower extending laterally of the width of said oven and a longitudinally extending connecting duct portion intermediate the sides of the oven beneath and in communication with the intake side of said blower, vertical ducts in said oven side walls communicating at their upper ends with the lateral sides of the headers of said collecting chamber, openings in the inner side walls of the oven superjacent the side edges of said hearth providing communication between the lower ends of said vertical ducts and said baking chamber and laterally extending duct means bridging the longitudinally extending connecting duct portion of said collecting chamber communicating at one end with the discharge side of said blower and at the opposite end thereof with said plenum chamber.

2. A circulating system in accordance with claim 1, including a duct extending longitudinally along each oven inner side wall over the side edges of said hearth open laterally to the lower portion of said inner side wall openings to provide communication between said longitudinally extending ducts and said vertical ducts, and a longitudinal slot associated with each of said longitudinally extending ducts providing communication between said baking chamber and said last named ducts.

3. In a circulating system for an oven having a solid hearth and a heating zone of longitudinally elongated extent, a horizontal partition in the upper portion of said oven defining a plenum chamber with the ceiling of said oven and a baking chamber with said hearth, a plurality of vents distributed over the area of said partition providing communication between said plenum chamber and said baking chamber, a blower in said ceiling between the ends of said heating zone, means providing communication between said plenum chamber and the discharge side of said blower, horizontal longitudinally adjustable baffle means in the lower portion of said plenum chamber adjacent its zone of communication with said last named means, said baffle means having transversely extending inverted upstanding V-shaped deflecting means for directing desired proportions of the atmosphere delivered thereto from said blower fore and aft in said plenum chamber, an opening in the opposite inner side walls of said oven adjacent the lower portion of said baking chamber in spaced fore and aft relation with respect to said blower, and return duct means communicating with said openings and the intake side of said blower for withdrawing atmosphere from said baking chamber through said side wall openings.

4. In a circulating system for an oven having a solid hearth for supporting the products to be baked, and a heating zone of longitudinally elongated extent, a horizontal partition in the upper portion of said oven defining a plenum chamber with the ceiling of said oven and a baking chamber with said hearth, a plurality of vents distributed over the area of said partition providing communication between said plenum chamber and said baking chamber, a blower in said ceiling between the ends of said heating zone, means providing communication between said plenum chamber and the discharge side of said blower, an opening in the opposite inner side walls of the oven fore and aft of said blower superjacent the side edges of said hearth, a duct extending longitudinally along each oven inner side wall over the side edges of said hearth open laterally to the lower portion of said inner side wall openings to provide communication between said longitudinal ducts and said inner side wall openings, a longitudinally extending slot associated with each of said longitudinally extending ducts providing communication between said baking chamber and said longitudinally extending ducts, and return duct means communicating with said openings and the intake side of said blower for withdrawing atmosphere from said baking chamber through said side wall openings.

5. In a circulating system for an oven having a conveyor run for supporting the products to be baked defining the bottom of a baking chamber, and a heating zone of longitudinally elongated extent; generally horizontal plenum chamber means in the upper portion of said oven defining the top of said baking chamber, a plurality of vents distributed over the area of said plenum chamber means providing communication between said plenum chamber and said baking chamber, blower means supported in the upper portion of said oven between the ends of said heating zone, duct means connecting the discharge side of said blower means with said plenum chamber means for blowing atmosphere downwardly through said vents into said baking chamber throughout said heating zone, generally vertical duct means along opposite inner side walls of the oven disposed in forward spaced relation with respect to said blower means and in rearward spaced relation with respect to said blower means, said vertical duct means having openings adjacent the side edges of said conveyor run communicating with said baking chamber, and horizontal collecting chamber means in the upper portion of said oven transversely spanning the baking chamber and having a section extending from its front to rear between fore and aft duct means communicating with the upper ends of said vertical duct means and the intake side of said blower to withdraw atmosphere from said baking chamber and maintain therein a circulation of atmosphere in forward and rearward direction from said vents to both said vertical duct means.

6. The combination defined in claim 5 in which baking chamber heating means are disposed in said baking chamber near the top thereof under said vents.

7. In a circulating system for an oven having a conveyor run defining the bottom of a baking chamber, and having a heating zone of longitudinal extent; generally horizontal plenum chamber means in the upper portion of said oven defining the top of said baking chamber, a plurality of vents distributed over the area of said plenum chamber means providing communication between said plenum chamber means and said baking chamber, a blower supported at the upper portion of said oven between the ends of said heating zone, a collecting chamber in the upper portion of said oven, said collecting chamber including header portions fore and aft of said blower extending laterally of the width of said oven at locations generally equally spaced from the blower, and a longitudinally extending connecting duct portion intermediate the sides of the oven beneath and in communication with the intake side of said blower, vertical ducts along said oven side walls communicating at their upper ends with the lateral sides of the headers of said collecting chamber, said ducts having openings superjacent the side edges of said conveyor run providing communication between the lower ends of said vertical ducts and said baking chamber, and duct means extending transversely of the longitudinally extending connecting duct portion of said collecting chamber communicating with the discharge side of said blower and with said plenum chamber means.

8. The combination defined in claim 7 in which said transversely extending duct means has openings in its ends near the side walls of said oven communicating with the plenum chamber means, and baffle means is provided in the path of the heated gaseous medium flowing through said openings for directing the flow both fore and aft in the plenum chamber means.

9. In a circulating system for an oven having a conveyor run defining the bottom of a baking chamber, and a heating zone of longitudinal extent; horizontal plenum chamber means in the upper portion of said oven defining the top of said baking chamber, a plurality of vents distributed over the area of said plenum chamber means providing communication between said plenum chamber means and said baking chamber, a blower communicating with the plenum chamber in the upper portion of the oven between the ends of said heating zone, duct means with opening means providing communication between said plenum chamber means and the discharge side of said blower, baffle means in said plenum chamber means under said opening means having a substantially V-shaped upper surface opposite said opening means and in the path of flow therethrough for directing proportions of the atmosphere delivered thereto from said blower fore and aft in said plenum chamber means, and vertically extending return duct means communicating with the baking chamber and with the intake side of said blower for withdrawing atmosphere from said baking chamber.

References Cited by the Examiner
UNITED STATES PATENTS

| | | | |
|---|---|---|---|
| 2,236,085 | 3/41 | Cook | 107—63 |
| 2,674,811 | 4/54 | Thornburg | 34—222 X |
| 2,704,040 | 3/55 | Warrington | 107—57 |
| 2,762,321 | 9/56 | Cook | 107—63 |
| 2,846,961 | 8/58 | Nelson | 107—55 |

ROBERT E. PULFREY, *Primary Examiner.*

J. D. SEERS, CHARLES A. WILLMUTH, *Examiners.*